(12) United States Patent
Wehr

(10) Patent No.: US 9,328,928 B2
(45) Date of Patent: May 3, 2016

(54) ROLLING FIRE PIT HOLDER

(71) Applicant: Dean D. Wehr, Swiftwater, PA (US)

(72) Inventor: Dean D. Wehr, Swiftwater, PA (US)

( * ) Notice: Subject to any disclaimer, the term of this patent is extended or adjusted under 35 U.S.C. 154(b) by 438 days.

(21) Appl. No.: 14/016,288

(22) Filed: Sep. 3, 2013

(65) Prior Publication Data

US 2015/0059728 A1     Mar. 5, 2015

(51) Int. Cl.
| | |
|---|---|
| *A47J 37/00* | (2006.01) |
| *F24B 3/00* | (2006.01) |
| *F24C 1/16* | (2006.01) |
| *A47J 33/00* | (2006.01) |
| *F23B 20/00* | (2006.01) |

(52) U.S. Cl.
CPC .. *F24C 1/16* (2013.01); *A47J 33/00* (2013.01); *F23B 3/00* (2013.01)

(58) Field of Classification Search
CPC ............. F24C 1/16; A47J 33/00; F23B 3/00
USPC .......................... 126/9 R, 25 R, 26, 29, 30, 59
See application file for complete search history.

(56) References Cited

U.S. PATENT DOCUMENTS

| | | | |
|---|---|---|---|
| 4,667,651 | A | 5/1987 | Groeneweg |
| 5,960,788 | A | 10/1999 | Bach et al. |
| 6,220,240 | B1 | 4/2001 | Grady et al. |
| D547,848 | S | 7/2007 | Grady et al. |

*Primary Examiner* — Kenneth Rinehart
*Assistant Examiner* — Gajanan M Prabhu
(74) *Attorney, Agent, or Firm* — Sanford J. Piltch

(57) ABSTRACT

A mobile fire pit holder is described with a base member having an outer wall with multiple segments and extending upward from an inwardly extending lower support shoulder at its periphery, a support framework extending across the space within the outer wall and supported at its respective ends by the inwardly extending shoulder, and a screen having perforations therein for drainage of water or other condensate that lies atop and is supported by the support framework. Fireproof material is placed within the space defined by the screen and the outer wall to provide a support for a fire pit. A set of wheels uniformly arrayed about the periphery of the holder below the lower support shoulder and attached at the respective ends of the support framework provides stability and rolling mobility to the holder.

6 Claims, 3 Drawing Sheets

ROLLING FIRE PIT HOLDER

BACKGROUND OF THE INVENTION

Fire pits have become desirable additions to outdoor living spaces. However, regardless of the shape or size of the fire pit, most must remain stationary in a fixed position. Some more recent fire pits, or outdoor cooking devices, are known to have the capacity to be lifted along one side and rolled about on wheels attached to an axle located on the opposite side. Although mobility has been minimally addressed, the problem of insulating the fire pit from a wooden deck remains a significant concern in preventing unwanted fires and destruction of property.

One portable fire pit or outdoor cooking apparatus is described in U.S. Pat. No. 4,667,651 [Groeneweg]. Mobility of the Groeneweg fire pit is accomplished by lifting the front support legs off the ground and maneuvering the fire pit on a pair of wheels each of which are attached to the rear support legs, respectively. A more recent design of a portable fire pit is described in U.S. Design Pat. D 547,848 [Grady, et al.]. The fire pit rests on a carrier that has a pair of wheels, each of which is attached to the rear support legs, respectively, of the carrier. The fire pit is lifted upward off of the front support legs by a handle that is connected to the rear support legs and extends outward toward the front so that the front legs can be lifted and the fire pit rolled on the wheels attached to the rear support legs to a new position. The wheeled carrier of Grady, et al. is similar to those of U.S. Pat. No. 6,220,240 [Grady, et al.] and U.S. Pat. No. 5,960,788 [Bach, et al.] also describing portable fire pits. But none of these earlier patents attempt to provide or teach any method or device that will allow a fire pit that rests on the ground to be made portable. Further, there is no discussion of precautions that are necessary and required to prevent the possibility of damage to, or the igniting of a fire when the fire pit is used on a wooden deck.

The present invention addresses both the mobility of a fire pit as well as the fire prevention aspect. It is, therefore, an object of the present invention to provide a mobile base upon which a fire pit can be placed to create a portable fire pit. It is also an object of the present invention to provide an insulating shield between the exterior of the fire pit and the support surface for the base by interposing a fire resistant material into the upper portion of the base. It is a further object of the present invention to provide a stable platform for the fire pit while permitting the base to be wheeled about from position to position. It is a still further object of the present invention to provide a base that will provide a stable support to any number of fire pits whether they have support legs, a single base support, or use the bowl as a support. Other objects will appear hereinafter.

SUMMARY OF THE INVENTION

A mobile fire pit holder of differing support framework constructions is described for supporting a fire pit above a fireproof material housed within a space defined above a perforated screen and within the sidewall of the fire pit holder. Depending on the support framework, different arrays of wheels and mounting positions are also described for creating greater mobility for the fire pit holder. The fire pit holder is made such that its center of gravity remains very low to the deck or patio surface for stability and enhanced mobility across the surface.

A mobile fire pit holder is comprised of a base member that has an outer wall with multiple segments that extends upward from an inwardly extending lower support shoulder located along its periphery. A support framework extends across the space within the outer wall and supported at its respective ends by the inwardly extending shoulder. A screen having perforations therein for drainage of water or other condensate extends across the open space lying atop and supported by the support framework. Fireproof material is placed within the space defined by the screen and the outer wall. The fireproof material may be selected from the group including small stone or gravel, large flat stone, and concrete paving blocks.

The support framework may be configured in a number of ways. A first configuration has two elongated pieces extending across the space defined by the outer wall which pieces are in perpendicular arrangement between opposing sidewall sections of the outer wall. The pieces utilize the shoulder as a support platform and create an "X" providing support extending to the center of the fire pit holder. A second configuration has a first set of parallel elongated pieces and a second set of parallel elongated pieces extending across the space defined by the outer wall spanning between alternating apices between segments of the side wall with the first set of parallel pieces overlying the second set of parallel pieces at their respective ends. A third configuration has a first elongated piece and a second set of parallel elongated pieces extending across the space defined by the outer wall the first elongated piece spanning between two opposing apices of the segments of the side wall and said set of parallel elongated pieces spanning between apices at opposite ends of segments of the side wall that are parallel to the first elongated piece and opposite to each other and lying atop the first elongated piece. In this configuration the pieces form an "H" with a laterally outward extending crossbar providing support extending to the center of the fire pit holder.

A set of wheels are uniformly arrayed about the periphery below the lower support shoulder and attached at the respective ends of the support framework to provide stability and rolling mobility to the holder. The wheels are part of a set of wheels numbering four or greater in number.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
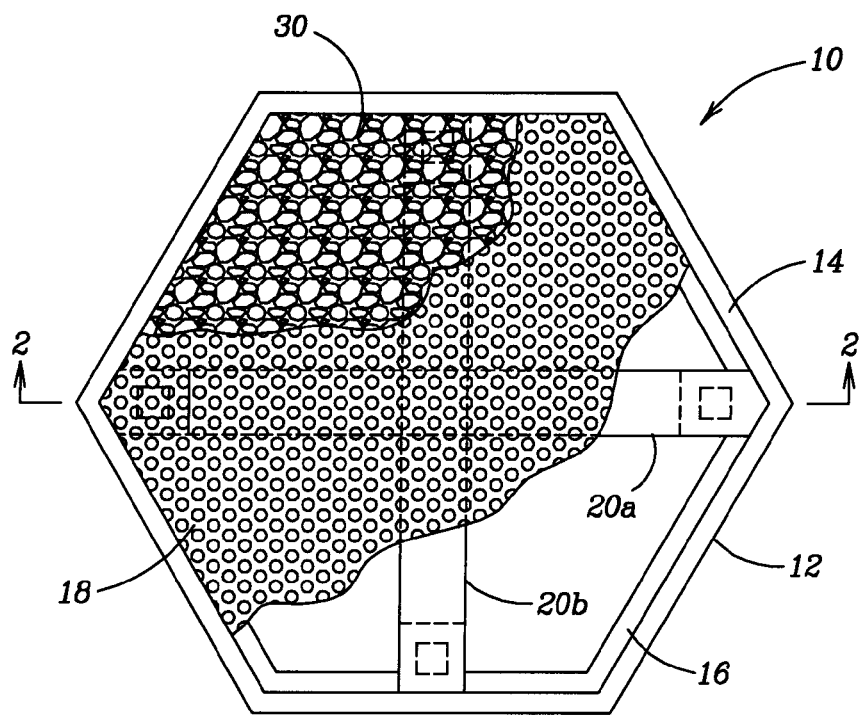
FIG. 1 is a top plan view with segments partially broken away to show the levels of material and support elements of the fire pit holder of the present invention.

Referring now to the drawings in detail, where like numerals refer to like parts or elements, there is shown in FIG. 1 a mobile fire pit holder 10 which has a six-sided geometric frame 12. The frame 12 has an outer wall 14 which is upstanding and is used to contain fireproof material 30 within the outer wall. The frame 12 also has a lower inwardly extending shoulder 16 providing for a location for mounting a set of wheels 32 and for mounting a supporting framework 20a, 20b. The support framework 20a, 20b is comprised of two wooden supports mounted across the open space in perpendicular arrangement between opposing sidewall sections of the six-sided outer wall 14 utilizing the shoulder 16 as a platform, thus creating an "X" providing support extending to the center of the fire pit holder 10. Mounted directly above, and utilizing the support of the support framework 20a, 20b, is a perforated screen 18 that rests atop the framework 20a, 20b. The combination of the outer wall 14 and the screen 18 provide a space into which the fireproof material 30 is placed and retained. The fireproof material 30 may be any fire impervious material such as stone that is capable of being moved about within the space to provide one or more depressions to retain a fire pit 40 or a fire pit stand 42 in its placed position without relative motion in any direction.

Figure 2:
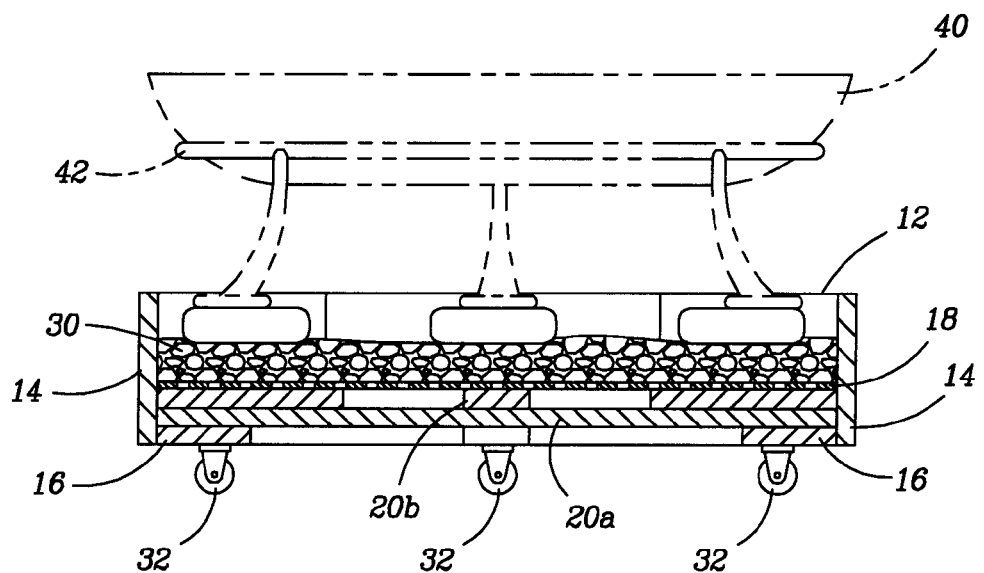
FIG. 2 is a sectional view taken along Line 2-2 of FIG. 1 showing the support elements of the fire pit holder of the present invention with one example of a fire pit positioned in the holder.

Referring to FIG. 2, one type of fire pit 40 and fire pit holder 42 is shown in phantom. The fire pit holder 42 is placed atop the fireproof material 30 with depressions made to retain the several feet of the fire pit holder 42 in position in the fireproof material 30. In this sectional view, it is easier to see the fireproof material 30 retained within the space made by the combination of the screen 18 and the outer wall 14 of the fire pit holder 10. The cross structure of the support framework 20a, 20b is also easier to see, as well as the shoulder 16 used to support the ends of the support framework 20a, 20b. The shoulder 16 is also used to mount the set of wheels 32 to the fire pit holder 10 to provide mobility so that the fire pit holder 10 and any mounted fire pit 40 can be rolled from one location to another over a reasonably flat surface. In this first version or mode of utilizing the support framework 20a, 20b, the set of wheels 32 are alternately mounted at 90° degree points of separation so that the wheels 32 are mounted at the midpoints of opposing segments of side wall 14 and at opposing apices of side wall 14. Thus, with the wheels 32 mounted to blocks (shown in phantom as squares in FIG. 1) and separated as shown, the fire pit holder achieves reasonable stability when in place or while being moved.

Figure 3:
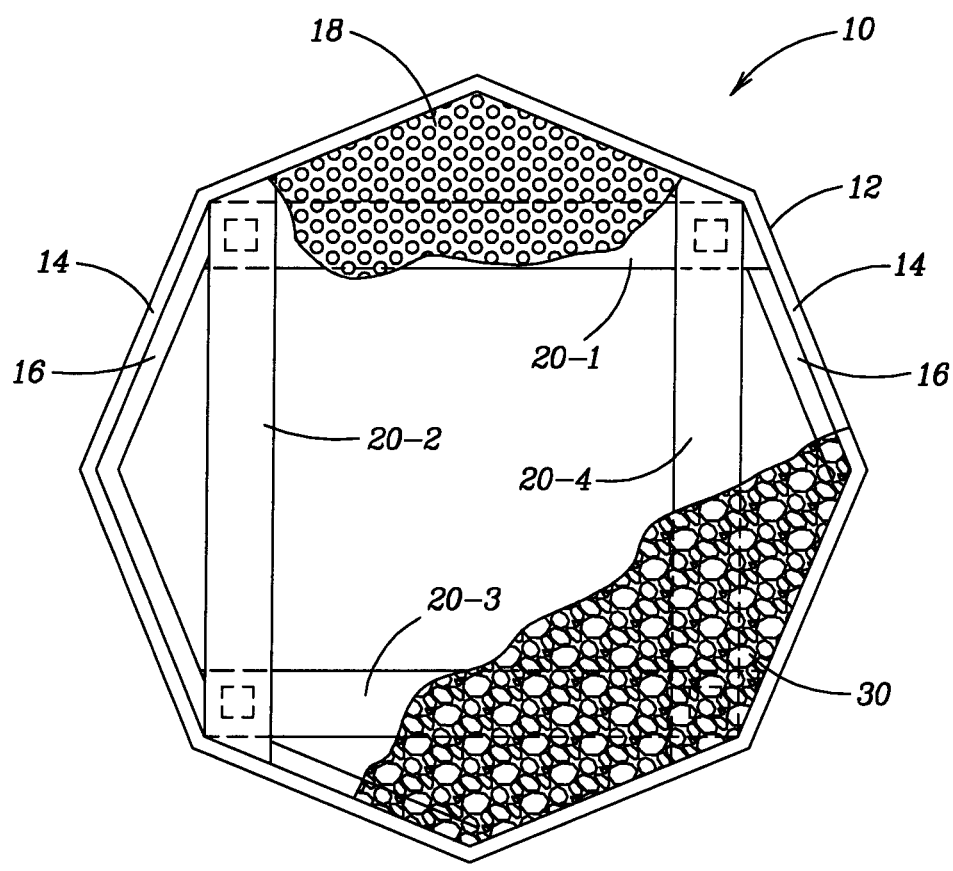
FIG. 3 is a top plan view of the fire pit holder of the present invention showing a different support structure and wheel array for the fire pit holder.

An alternate support framework 20-1 to 20-4 is shown in FIG. 3 for an eight-sided fire pit holder 10. In this embodiment, the support framework spans between alternating apices between the segments of the side wall 14 with support framework pieces 20-1 and 20-3 overlying pieces 20-2 and 20-4. As in the previously described embodiment, the perforated screen 18 is mounted atop the support framework 20-1 through 20-4 with the fireproof material 30 placed into the space created above the screen 18 and within the sidewall 14. The fire pit 40, or the fire pit stand 42, can be positioned within the space atop the fireproof material 30 as described above.

In this second version or mode of utilizing the support framework 20-1 through 20-4, the set of wheels 32 are mounted at 90° degree points of separation at the locations where the ends of each of the pieces 20-1, 20-4 overlie the shoulder 16. In this way the wheels 32 are mounted at the apices of adjacent segments of side wall 14 in a square configuration. Thus, with the wheels 32 mounted to blocks (shown in phantom as squares in FIG. 3) and separated as shown, the fire pit holder 10 achieves reasonable stability when in place or while being moved.

Figure 4:
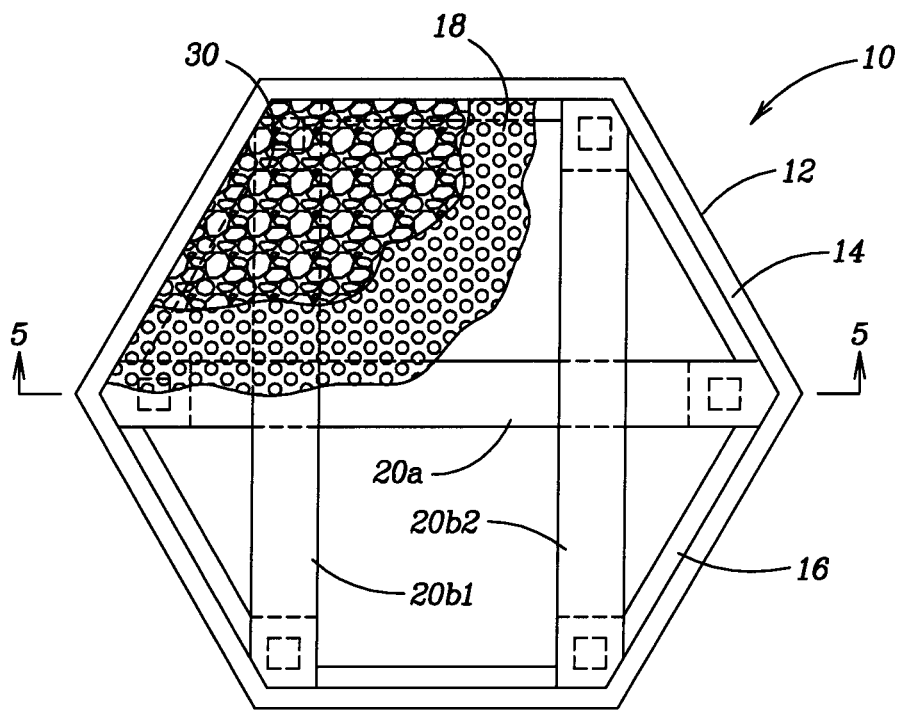
FIG. 4 is a top plan view of the fire pit holder of the present invention with a second alternate support structure and wheeled base for the fire pit holder.
Figure 5:
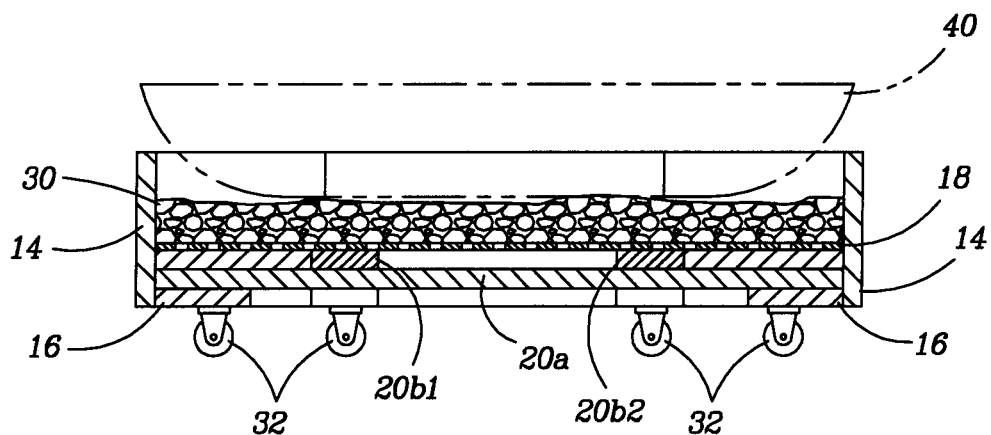
FIG. 5 is a sectional view taken along Line 5-5 of FIG. 4 showing the support elements of the fire pit holder and an alternate example of a fire pit positioned in the holder.

Another embodiment of the support framework is shown in FIGS. 4-5 in a six-sided fire pit holder 10. This alternate support framework 20a, 20b1 and 20b2 is also situated within the side wall 14 and uses the shoulder 16 as support for each piece of the support framework's respective ends. As described above, support framework piece 20a extends across the open space between two opposing apices of the several segments of the side wall 14. Lying atop the piece 20a are both support framework pieces 20b1 and 20b2 that also extend across the space between the apices at opposite ends of the segments of the side wall 14 that are parallel to piece 20a and opposite to each other. The framework support pieces 20a, 20b1 and 20b2 form an "H" with a laterally outward extending crossbar within the space defined by the side wall 14 of the fire pit holder 10. The "H" forms the support for the perforated screen 18 that, in turn, supports the fireproof material 30 that is retained atop the screen 18 and within the side wall 14. As shown in FIG. 5, the fire pit 40 (in a bowl configuration) may be positioned directly on top of the fireproof material 30 as described previously.

In the third embodiment the wheels 32 are also mounted utilizing the support framework 20a, 20b1 and 20b2. The set of six wheels 32 are mounted at 60° degree points of separation at the locations along the side wall 14 where the ends of each of the support framework pieces 20-1, 20-4 overlie the shoulder 16. In this way the wheels 32 are mounted at the apices of adjacent segments of side wall 14 in a hexagonal configuration. Thus, with the wheels 32 mounted to blocks (shown in phantom as squares in FIG. 4) and separated as shown, this version of the fire pit holder 10 also achieves reasonable stability when in place or while being moved.

There are several similarities in the construction of the three different support systems for the fire pit holder 10 of the present invention. In each of the embodiments the side wall 12 can be made of wood or metal having a depth of at least 5 inches and preferably 6 inches. The support framework can also be made of wood or metal and should be at least 0.75 inches thick and at least 5 inches wide. The perforated screen 18 can be made from perforated aluminum or from stainless steel. However, since the fire pit holder 10 will likely remain outdoors in all kinds of weather, the frame, including the support framework, the screen and any other metal part, such as fasteners, should be resistant to oxidation (rust) and corrosion in order to retain rigidity and complete functionality.

The fireproof material 30 was described as being stone or gravel of a relatively consistent size of 1 inch. Flat stones can be used instead of the gravel and concrete pavers can be added above the gravel for a more solid surface look. It is important to note that the screen 18 is provided not only to retain the fireproof material 30 within the space created within the side wall 14, but also to provide for drainage of seasonal rain water or snow melt from the fire pit holder 10.

The wheels 32, whatever their number depending upon the configuration of the support framework, are required to provide a larger track for increased stability. The wheels 32 are also required to be impact resistant and resistant to seasonal changes in temperature, UV light, and deterioration of material through oxidation, etc. The diameter of the wheels 32 is preferred to be small to retain the low center of gravity of the fire pit holder 10, especially when in motion.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A mobile fire pit holder comprising a base member having an outer wall having multiple segments and extending upward from an inwardly extending lower support shoulder at its periphery, a support framework extending across the space within the outer wall and supported at its respective ends by the inwardly extending shoulder, a screen having perforations therein for drainage of water or other condensate extends across the space lying atop and supported by the support framework, fireproof material contained within the space defined by the screen and the outer wall, and a set of wheels uniformly arrayed about the periphery below the lower support shoulder and attached at the respective ends of the support framework providing stability and rolling mobility to said holder.

2. A mobile fire pit holder according to claim 1, wherein the support framework having two elongated pieces extends across the space defined by the outer wall in perpendicular arrangement between opposing sidewall sections of the outer wall utilizing the shoulder as a support platform and creating an "X" providing support extending to the center of the fire pit holder.

3. A mobile fire pit holder according to claim 1, wherein the support framework having a first set of parallel elongated pieces and a second set of parallel elongated pieces extends across the space defined by the outer wall spanning between alternating apices between segments of the side wall with the first set of parallel pieces overlying the second set of parallel pieces at their respective ends.

4. A mobile fire pit holder according to claim 1, wherein the support framework having a first elongated piece and a second set of parallel elongated pieces extends across the space defined by the outer wall the first elongated piece spanning between two opposing apices of the segments of the side wall and said set of parallel elongated pieces spanning between apices at opposite ends of segments of the side wall that are parallel to the first elongated piece and opposite to each other and lying atop the first elongated piece forming an "H" with a laterally outward extending crossbar providing support extending to the center of the fire pit holder.

5. A mobile fire pit holder according to claim 1, wherein said fireproof material is selected from the group including small stone or gravel, large flat stone, and concrete paving blocks.

6. A mobile fire pit holder according to claim 1, wherein said wheels are part of a set of wheels numbering four or greater in number.

* * * * *